United States Patent
Sadovsky et al.

(10) Patent No.: US 7,536,486 B2
(45) Date of Patent: May 19, 2009

(54) AUTOMATIC PROTOCOL DETERMINATION FOR PORTABLE DEVICES SUPPORTING MULTIPLE PROTOCOLS

(75) Inventors: Vladimir Sadovsky, Bellevue, WA (US); Yonghong Guo, Issaquah, WA (US); John C. Dunn, Issaquah, WA (US); Stephen R. Handley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 10/909,970

(22) Filed: Jul. 30, 2004

(65) Prior Publication Data

US 2006/0026269 A1    Feb. 2, 2006

(51) Int. Cl.
*G06F 3/00* (2006.01)

(52) U.S. Cl. ............... 710/11; 710/3; 710/8; 710/9; 710/20; 710/21

(58) Field of Classification Search .......... 710/3, 710/8, 9, 11, 20, 21
See application file for complete search history.

(56) References Cited

U.S. PATENT DOCUMENTS

| | | | |
|---|---|---|---|
| 5,649,128 A | 7/1997 | Hartley | |
| 5,974,474 A | 10/1999 | Furner et al. | |
| 5,991,835 A * | 11/1999 | Mashimo et al. | 710/58 |
| 6,038,400 A * | 3/2000 | Bell et al. | 710/11 |
| 6,334,160 B1 | 12/2001 | Emmert et al. | |
| 6,463,078 B1 | 10/2002 | Engstrom et al. | |
| 6,484,219 B1 | 11/2002 | Dunn et al. | |
| 6,901,457 B1 * | 5/2005 | Toombs et al. | 710/11 |
| 2003/0045236 A1 | 3/2003 | Chang et al. | |
| 2003/0167376 A1 * | 9/2003 | Koh | 711/115 |
| 2003/0196007 A1 | 10/2003 | Baron | |
| 2003/0214943 A1 | 11/2003 | Engstrom et al. | |
| 2005/0210464 A1 | 9/2005 | Machida | |

OTHER PUBLICATIONS

Remple, T. B., "USB on-the-go interface for portable devices", International Conference on Consumer Electronics, 2003 Digest of Technical Papers, Jun. 17-19, 2003, pp. 8-9.

Chun et al., "A fully synthesizable Bluetooth baseband module for a system-on-a-chip", ETRI Journal, Oct. 2003, vol. 25, No. 5, pp. 328-336.

Young et al., "Universal serial bus enhances virtual instrument-based distributed power monitoring", IEEE Transactions on Instrumentation and Measurement, Dec. 2001, vol. 50, No. 6, pp. 1692-1697.

(Continued)

*Primary Examiner*—Niketa I Patel
*Assistant Examiner*—Jasjit S Vidwan
(74) *Attorney, Agent, or Firm*—Lee & Hayes, PLLC

(57) ABSTRACT

In accordance with certain aspects of the automatic protocol determination for portable devices supporting multiple protocols, a portable device detects which one of the multiple protocols is being used by the host device for subsequent communication with the portable device. This detection is based on the content of a command received from a host device. The detected protocol is then used by the portable device for subsequent communication with the host device. The host device may also send, to the portable device, a notification of which of the multiple protocols is being used by the host device.

19 Claims, 9 Drawing Sheets

OTHER PUBLICATIONS

"Microsoft Showcases New Technologies to Enhance PC Digital Media and Entertainment Experiences", web page: http://www.microsoft.com/presspass/press/2003/may03/05-07newmctechnologiespr.asp, May 7, 2003, 3 pages.

Media Transfer Protocol Enhanced, Microsoft Corporation, Revision 0.83, Nov. 15, 2004, 114 pages.

Universal Serial Bus Mass Storage Class, UFI Command Specification, Revision 1.0, Dec. 14, 1998, 53 pages.

Universal Serial Bus Specification, Compaq, Intel, Microsoft, NEC, Revision 1.1, Sep. 23, 1998, 328 pages.

Universal Serial Bus Specification, Compaq, Hewlett-Packard, Intel, Lucent, Microsoft, NEC, Philips, Revision 2.0, Apr. 27, 2000, 650 pages.

* cited by examiner

AUTOMATIC PROTOCOL DETERMINATION FOR PORTABLE DEVICES SUPPORTING MULTIPLE PROTOCOLS

TECHNICAL FIELD

This invention relates to communications between devices, and particularly to automatic protocol determination for portable devices supporting multiple protocols.

BACKGROUND

A large selection of portable devices designed to connect to a computer or other host device are currently available to consumers. Examples of such portable devices include music players, digital cameras, video cameras, digital recorders, and so forth. In order to make these devices more user-friendly, "plug and play" technologies have been developed that allow the user to simply plug the portable device into the computer, in response to which the computer automatically detects the presence of the portable device and loads any software necessary for communicating with the device. From the point of view of the user, all he or she has to do is connect the portable device to the computer and the portable device automatically works with the computer. Portable devices and computers supporting the USB (Universal Serial Bus) specification are examples of using plug and play technology.

In order to implement such plug and play technology, the computer typically has an operating system that is configured to detect the type of a particular portable device that is connected to the computer. Once detected, the computer operating system can determine the correct software, oftentimes referred to as a "driver", to load in order to communicate with the portable device. This driver and the portable device both support a particular protocol that allows the two to communicate with one another. The protocol describes, for example, what commands can be sent to one another, as well as the structure for such commands. This driver allows the computer operating system to access functionality exposed by the portable device.

Although a large number of portable devices are currently commercially available, new versions and generations of portable devices are constantly being developed and released, and oftentimes these new versions or generations will include new features or operations. Similarly, new versions and generations of computer operating systems are also constantly being developed and released, and oftentimes these new versions or generations will include new features or operations. Unfortunately, the development and release cycles for portable devices and computer operating systems do not always coincide with one another. Thus, situations can arise where a new portable device is released that supports new features through a new protocol, but some operating systems do not yet include a driver to support this new feature or new protocol. This is oftentimes the case when a new portable device including new features and a new protocol is released, but many computers are still running older operating systems that do not yet have installed a driver to support the new features or the new protocol, or are incompatible with the new features.

Additionally, oftentimes if the new portable device includes the new features and the new protocol, when the portable device is connected to a computer that does not yet have installed a driver to support the new features or the new protocol, the operating system displays a warning message or error message to the user. Such a situation can be troublesome for many users, as they frequently do not know how to respond to the message. Furthermore, this situation detracts from a positive user experience because it is typically a manual input that the user must make to remove the warning or error message, and the user is left with a feeling that an error or problem exists when using the portable device with the computer.

One solution to these problems is to build a portable device that supports multiple protocols, one for the older operating system and one for the newer operating system, and then allow the user to manually configure the portable device in order to select which protocol the portable device should use. Such manual configuration can be performed, for example, through a user interface menu exposed by the portable device. However, such a solution is rather user-unfriendly because it requires the user to manually select the protocol, as well as have the appropriate knowledge to know which protocol is the correct protocol to select.

Another solution to these problems is to have the user install on the computer the appropriate driver and/or other software to support the new features when the portable device is first connected to the computer. However, such a solution is also user-unfriendly because it requires the user to make the appropriate driver and/or other software available to the computer. This can involve, for example, the user carrying a disc with the driver and/or other software along with the portable device, which detracts from the portable nature of the device.

SUMMARY

Automatic protocol determination for portable devices supporting multiple protocols is described herein.

In accordance with certain aspects of the automatic protocol determination, a portable device detects which one of multiple protocols is being used by the host device for subsequent communication with the portable device. This detection is based on the content of a command received from a host device. The detected protocol is then used by the portable device for subsequent communication with the host device.

In accordance with other aspects of the automatic protocol determination, a host device selects one of multiple protocols to use in communicating with the portable device. This selection is based on one or more identifiers received by the host device from the portable device. The host device also sends, to the portable device, a notification of the one of the plurality of protocols selected by the device.

BRIEF DESCRIPTION OF THE DRAWINGS

The same numbers are used throughout the document to reference like components and/or features.

DETAILED DESCRIPTION

Figure 1:
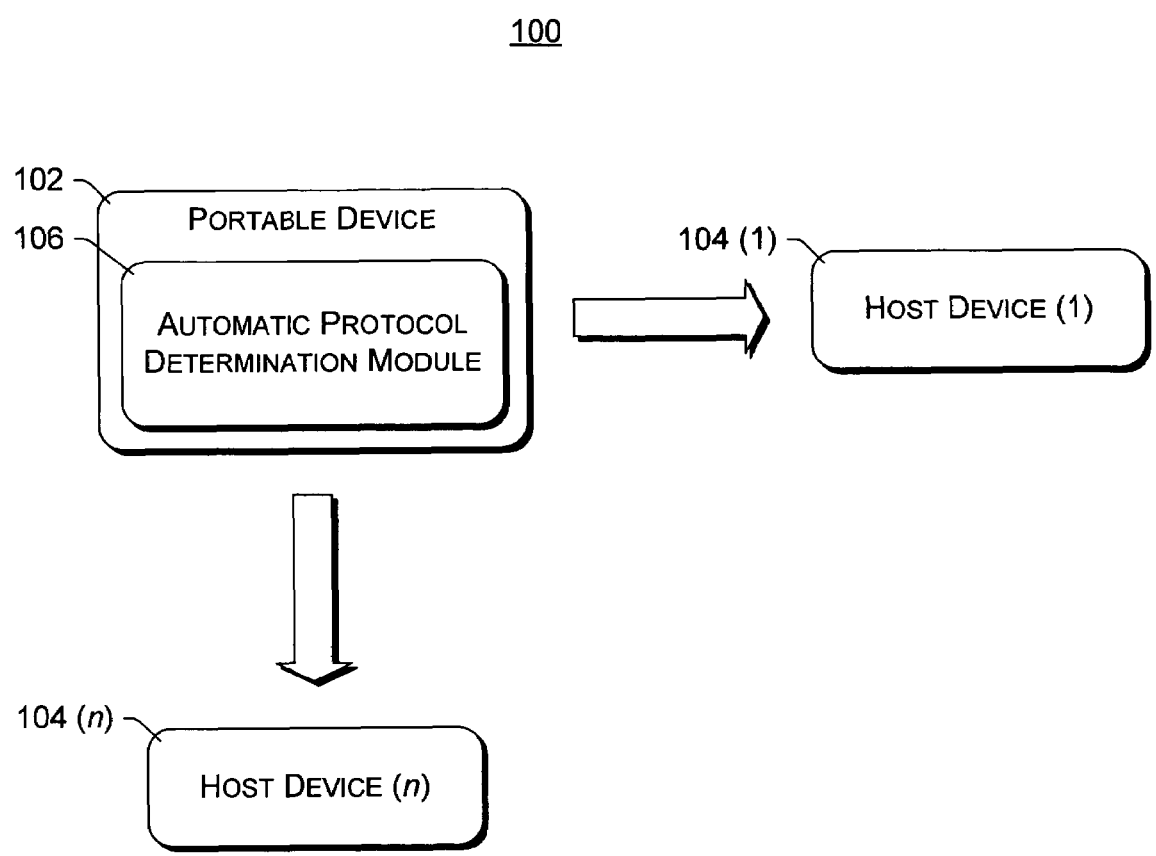
FIG. 1 illustrates an example environment in which the automatic protocol determination for portable devices supporting multiple protocols described herein can be used.

FIG. 1 illustrates an example environment 100 in which the automatic protocol determination for portable devices supporting multiple protocols described herein can be used. Environment 100 includes a portable device 102 and multiple (n) host devices 104. Portable device 102 can connect to any one of host devices 104. Typically, portable device 102 connects to only one host device 104 at a time, although alternatively portable device 102 may connect to multiple host devices 104 concurrently.

Portable device 102 can be any of a variety of different devices. Device 102 is referred to as portable as it is typically designed to be easily moved by the user from one host device 104 to another host device 104. Examples of portable device 102 include digital recorders, digital cameras, camcorders, music players (e.g., playing CDs, DVDs, music stored in MP3 (MPEG Audio Layer 3) or WMA (Windows Media Audio) formats, etc.), wireless phones (e.g., multifunction media-enabled cellular phones that connect to host device 104 for the purpose of, for example, synchronizing information with the host device 104), and so forth.

Host device 104 can also be any of a variety of different devices. Host device 104 is typically designed to allow a portable device 102 to be connected to it, and in some situations may itself be a portable device 102 (e.g., portable device 102 may be a portable music player, and host device 104 may be another portable music player). Thus, the communication discussed herein may be peer-to-peer communication between two portable devices 102. Examples of host device 104 include computers (e.g., desktop computers, server computers, laptop or notebook computers, handheld computers, automotive computers or PCs, etc.), set-top boxes (e.g., digital video recorders, gaming consoles, television tuners such as cable boxes or satellite boxes, etc.), printers, and so forth.

As used herein, portable device 102 connecting to a host device 104 refers to portable device 102 being in communication with the host device 104, allowing commands and/or data to be transmitted between the devices 102 and 104. This communication can be over a wire medium (e.g., a cable) and/or a wireless medium (e.g., using radio frequency signals, ultrasonic signals, infrared signals, etc.).

Portable device 102 is capable of communicating with host device 104 using multiple different protocols. However, only one of these multiple different protocols can be actively used for communication between portable device 102 and host device 104 at any particular point in time. Thus, as discussed herein, when portable device 102 and host device 104 are connected to one another, a particular one of the multiple different protocols is selected to be used in communicating between one another.

A protocol refers to a collection of rules, procedures, and/or conventions relating to the format and/or timing of data transmission between two devices, including commands that can be sent between devices and the formats for those commands. In certain implementations two protocols are supported by portable device 102, although alternatively three or more protocols may be supported by portable device 102. These two protocols are referred to herein as a base functionality protocol and an enhanced functionality protocol. As their names imply, the base functionality protocol supports just the basic functionality for portable device 102, while the enhanced functionality protocol supports more robust functionality. The enhanced functionality protocol allows additional functionality of portable device 102 to be accessed beyond that which can be accessed using the base functionality protocol.

By way of example, portable device 102 may be a combination device that is both a digital camera as well as a portable music player (e.g., playing music stored in the MP3 or WMA formats). The base functionality protocol may allow host device 104 to retrieve digital pictures that have been taken by the digital camera and stored on the camera. The enhanced functionality protocol, however, may further allow host device 104 to store music on the camera, as well as control the operation of the camera. The operation of the camera could be, for example, changing picture-taking settings of the camera (such as compression algorithm used by the camera, white balance levels, whether spot- or metered-focusing is to be used, and so forth), taking digital pictures (such as host device 104 activating the shutter release on the digital camera), playing back music, and so forth.

The exact nature of the base and enhanced functionality protocols will vary by portable device as well as the desires of the portable device manufacturer and the desires of the manufacturer of the operating system on the host device. However, the enhanced functionality protocol allows additional features of the portable device to be accessed by the host device and/or allows more functionality of the portable device to be used by the host device. An example of a base functionality protocol is the Universal Serial Bus (USB) Mass Storage Class—UFI Command Specification, Revision 1.0, available from the USB Implementers Forum. An example of an enhanced functionality protocol is the Media Transfer Protocol (MTP) Specification, available from Microsoft Corporation of Redmond, Wash.

It should be noted that communication between portable device 102 and host device 104 can employ different protocols at different levels or layers. For example, the base functionality protocol and enhanced functionality protocol discussed herein may both operate on top of the USB protocol, such as in accordance with the USB Specification, Revision 1.1 or Revision 2.0, both available from the USB Implementers Forum. The references herein to multiple protocols and portable device 102 being capable of communicating with host device 104 using multiple different protocols refer to multiple protocols at the same level or layer.

Portable device 102 includes an automatic protocol determination module 106. As discussed in more detail below, automatic protocol determination module 106 automatically determines which of multiple protocols that are supported by portable device 102 is being used by a particular host device 104 (e.g., either the base functionality protocol or the enhanced functionality protocol). Once this determination is made, portable device 102 can operate to communicate with host device 104 using whichever of the multiple protocols is being used by host device 104. This protocol selection is made automatically, and alleviates the user of portable device 102 of the burden of carrying a driver (e.g., on a disk) along with portable device 102 in order for portable device 102 to communicate with host device 104.

Figure 2:
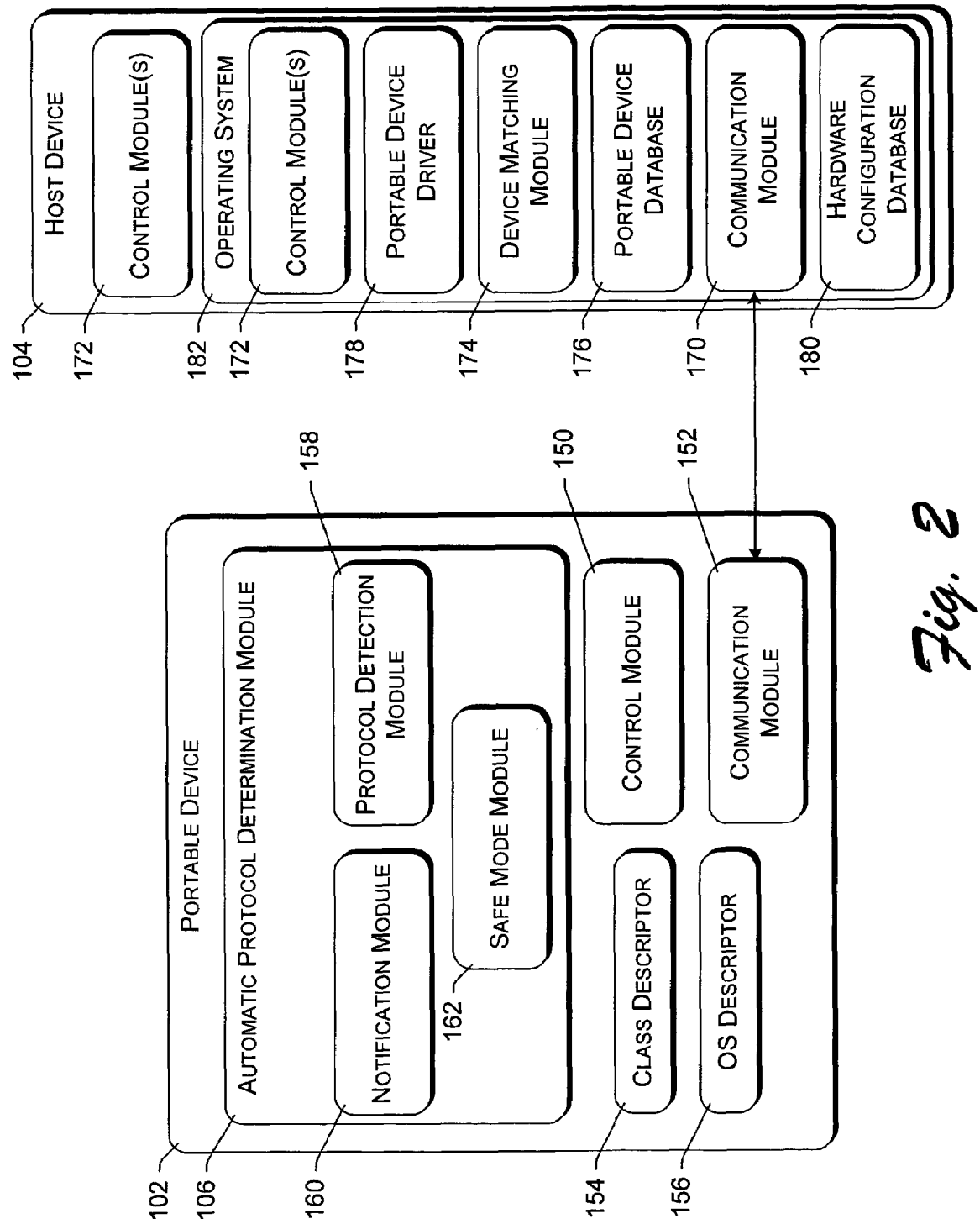
FIG. 2 illustrates an example portable device and an example host device in additional detail.

FIG. 2 illustrates an example portable device 102 and an example host device 104 in additional detail. Portable device 102 includes a control module 150, a communication module 152, a class descriptor 154, and an operating system (OS) descriptor 156. Portable device 102 also includes automatic protocol determination module 106, having a protocol detection module 158 and a notification module 160. Automatic protocol determination module 106 also includes a safe mode module 162, which is discussed in additional detail below.

Control module 150 controls the general operation of portable device 102. The exact operation of control module 150 will vary by device, depending on the type of portable device (e.g., digital recorder or music player) as well as the functionality that the manufacturer of portable device 102 desires to provide. For example, in a digital camera control module 150 would control the capturing, storing, and optionally playback of digital pictures.

Communication module 152 manages communication with host device 104. Communication module 152 receives commands and/or data from communication module 170 of host device 104, and transmits commands and/or data to communication module 170. The commands and/or data are transferred over whatever communication medium or media are connecting portable device 102 and host device 104. Communication module 152 manages the communication with host device 104 using one of the multiple protocols supported by portable device 102, as identified to communication module 152 by automatic protocol determination module 106.

Class descriptor 154 is a general identifier or descriptor of the functionality supported by portable device 102. In certain implementations, where portable device 102 and host device 104 communicate over a USB connection (e.g., a connection in accordance with the USB Revision 1.1 or 2.0 Specification), class descriptor 154 is a device class ID. Class descriptor 154 is used to notify host device 104 of a general protocol or general functionality that portable device 102 supports, such as the general class of device that portable device 102 is. For example, class descriptor 154 may indicate that portable device 102 supports a basic imaging protocol or basic digital storage protocol.

OS descriptor 156 is a more specific identifier or descriptor of the functionality supported by portable device 102. OS descriptor 156 is used to notify host device 104 of enhanced functionality that portable device 102 supports. OS descriptor 156 is designed to be used with host devices 104 running an operating system or other control program (or one or more hardware control modules or chips) that understands an OS descriptor 156 and can associate particular OS descriptors 156 with particular enhanced functionality. In certain implementations, OS descriptor 156 is a descriptor as described in U.S. Pat. No. 6,484,219, entitled "Host-Specified USB Device Requests".

Host device 104 includes communication module 170, control module(s) 172, devices matching module 174, portable device database 176, portable device driver 178, and hardware configuration database 180. Oftentimes these components 170-180 are part of an operating system 182 running on host device 104.

Communication module 170 manages communication with portable device 102. Communication module 170 manages the communication with portable device 102 using the same one of the multiple protocols supported by portable device 102 as is used by communication module 152.

Control module(s) 172 controls the general operation of host device 104. The exact operation of control module(s) 172 will vary by device, depending on the type of host device (e.g., desktop computer or printer) as well as the functionality that the manufacturer of host device 104 desires to provide. Control module(s) 172 may be part of the operating system 182 and/or separate from the operating system. For example, in a printer, control module 172 would control the generation of hard copy output based on the data input to the printer. By way of another example, in a desktop computer, control module 172 would manage the running of programs on the computer as well as control the various resources of the computer (e.g., memory, storage, network connections, etc.).

Host device 104 installs and executes a module referred to as a driver in order to communicate with portable device 102 over one of the multiple protocols. Device matching module 174 attempts to locate a portable device driver from portable device database 176 to use for communicating with a particular portable device. In certain implementations, device matching module 174 is part of the operating system 182 on host device 104.

Portable device database 176 is a listing or record of portable devices for which host device 104 has a driver that is either already installed or can be installed (e.g., host device 104 knows where to obtain, and is currently able to obtain, the driver). Each such driver is associated with one or more descriptors that may be received from portable device 102. These descriptors can be class descriptors or OS descriptors. Device matching module 174 compares a descriptor(s) received from portable device 102 with the descriptors included in portable device database 176. When a match is found (a descriptor in database 176 is found that is the same as the descriptor received from portable device 102), module 174 identifies the driver associated with that descriptor in database 176 and installs the driver as portable device driver 178.

The descriptor(s) that host device 104 receives from portable device 102 may be a class descriptor and/or an OS descriptor. If an OS descriptor is received and device matching module 174 finds a match to the OS descriptor in portable device database 176, then the driver installed will be a driver that supports the enhanced functionality of portable device 102. Subsequent communication between portable device 102 and host device 104 will thus be carried out using the enhanced functionality protocol supported by the driver, which may also be referred to as an enhanced driver or an enhanced functionality driver. On the other hand, if no OS descriptor is received, or no match to the OS descriptor is found in the portable device database 176, then the driver installed will be a driver that supports only the base functionality of portable device 102. Subsequent communication between portable device 102 and host device 104 will thus be carried out using the base functionality protocol supported by the driver, which may also be referred to as a base driver or a base functionality driver.

Protocol detection module 158 automatically detects which of the multiple protocols supported by portable device 102 is being used by host device 104 for subsequent communication with portable device 102. Once detected, notification module 160 notifies communication module 152 of the detected protocol, allowing communication module 152 to proceed with communicating with host device 104 using the appropriate protocol (that is, using the same protocol as was selected by host device 104).

Protocol detection module 158 can automatically detect which of the multiple protocols supported by portable device 102 is being used by host device 104 for subsequent communication with portable device 102 in any of a variety of manners. In certain embodiments, protocol detection module 158 detects the protocol by receiving a protocol identification notification, such as a specific "protocol identification" command, from host device 104. This notification can be sent by, for example, portable device driver 178 when it is installed, or alternatively by some other component (such as device matching module 174 when it identifies the match). The notification may be sent automatically by host device 104 or alternatively in response to a request for the information from portable device 102.

In other embodiments, protocol detection module 158 detects the protocol by monitoring a command(s) and/or data received from host device 104 and automatically determining from the monitored command(s) and/or data which protocol is being used by host device 104. This determination can be based on the content of commands, such as receipt of a particular commands or receipt of a command with particular information included the command, based on the way in which commands are sent by host device 104, and so forth.

For example, the multiple protocols supported by portable device 102 may have different commands. So, if a command is received from host device 104, then protocol detection module 158 can detect which protocol host device 104 is using by determining which protocol the command is part of. In this example, the content of the command would be the command itself rather than other parameters of the command (e.g., the "Write" command rather than parameters of what data is to be written or where the data is to be written).

By way of another example, the multiple protocols supported by portable device 102 may have different data structures. E.g., one protocol may use a data structure for commands and data that includes a field at the beginning of the data structure with a particular signature or identifier in it. This particular signature indicates, for example, that the data structure is from a particular driver or is in accordance with a particular protocol. So, if a command or other data is received from host device 104, protocol detection module 158 can determine whether the particular signature is present. If the signature is present then protocol detection module 158 can readily determine that that protocol is the protocol being used by host device 104. In this example, the particular signature or identifier would be the content of the command.

It should be noted that, in situations where portable device 102 supports only two protocols, then protocol detection module 158 may detect the command based on the absence of particular information rather than the presence of particular information. For example, if a command is received from host device 104 and module 158 determines that that command is not a valid command in the first of the two protocols, then module 158 can detect that the second of the two protocols is being used by host device 104. By way of another example, if a data structure without a particular signature used by a first of the two protocols is received from host device 104, then module 158 can detect that the second of the two protocols is being used by host device 104.

Generally, the first time portable device 102 is connected to host device 104, portable device 102 transmits class descriptor 154 to host device 104. Device matching module 174 receives class descriptor 154, and may also request OS descriptor 156 from portable device 102. One of the modules in portable device 102, such as communication module 152, is responsible for reporting the descriptors 154 and/or 156 to host device 104. Device matching module 174 then attempts to match one or both of the descriptors 154 and 156 to a descriptor listed in portable device database 176, and loads the driver associated with the matching descriptor. Subsequent communication with portable device 102, as well as the control of portable device 102, is then carried out using this loaded driver.

As part of the process of installing the driver at host device 104, host device 104 also typically maintains a record of portable device 102 in hardware configuration database 180. This record includes various information, such as a unique identifier of portable device 102 (this unique identifier may be received by host device 104 from portable device 102 along with class descriptor 154), an indication of which driver is to be installed to communicate with portable device 102 (that is, which driver is bound to portable device 102), the class descriptor reported by portable device 102, and the OS descriptor reported by portable device 102 (the OS descriptor is recorded in configuration database 180 regardless of whether a match to the OS descriptor was found in portable device database 176). Hardware configuration database 180 is typically maintained by the operating system of host device 104 (e.g., in a Windows® operating system, database 180 is typically maintained in the Windows® operating system registry). The second and subsequent times that portable device 102 is connected to host device 104, the operating system can access hardware configuration database 180, identify the proper driver based on the unique identifier of the portable device 102, and load the proper driver for portable device 102. Alternatively, the driver may be automatically loaded when the operating system begins running, regardless of whether portable device 102 is connected to host device 104. This operation involving the second and subsequent times that portable device 102 is connected to host device 104 may change when the operating system on host device 104 is upgraded, as discussed in additional detail below.

Alternatively, host device 104 may maintain no record of portable device 102 or which driver is to be installed to communicate with portable device 102. Rather, the general process discussed above regarding the first time portable device 102 is connected to host device 104 may be repeated every time that portable device 102 is connected to host device 104.

Different host devices 104 may run different operating systems 182. Operating system 182 refers to whatever control program or component, whether implemented in software, firmware, hardware, or combination thereof, manages the control of host device 104. Examples of operating systems 182 include any of the family of Windows® operating systems, a control program(s) managing the operation of a printer, and so forth.

The operating systems 182 that may run on host devices 104 can be viewed generally as belonging to one of two groups: (1) operating systems that do not understand OS descriptors; (2) operating systems that do understand OS descriptors. Operating systems that fall in the first group, which do not understand OS descriptors, will attempt to match only class descriptor 154 received from portable device 102. Such operating systems do not ask for an OS descriptor and would not understand what an OS descriptor was or how to handle an OS descriptor if one were received. However, operating systems that fall in the second group, which do understand what OS descriptors are and how to handle OS descriptors, will obtain OS descriptor 156 from portable device 102 and will attempt to match OS descriptor 156. Typically, the OS obtains OS descriptor 156 by requesting OS descriptor 156 from portable device 102. If that matching attempt is unsuccessful, then the operating system will attempt to match class descriptor 154 received from portable device 102.

Figure 3:
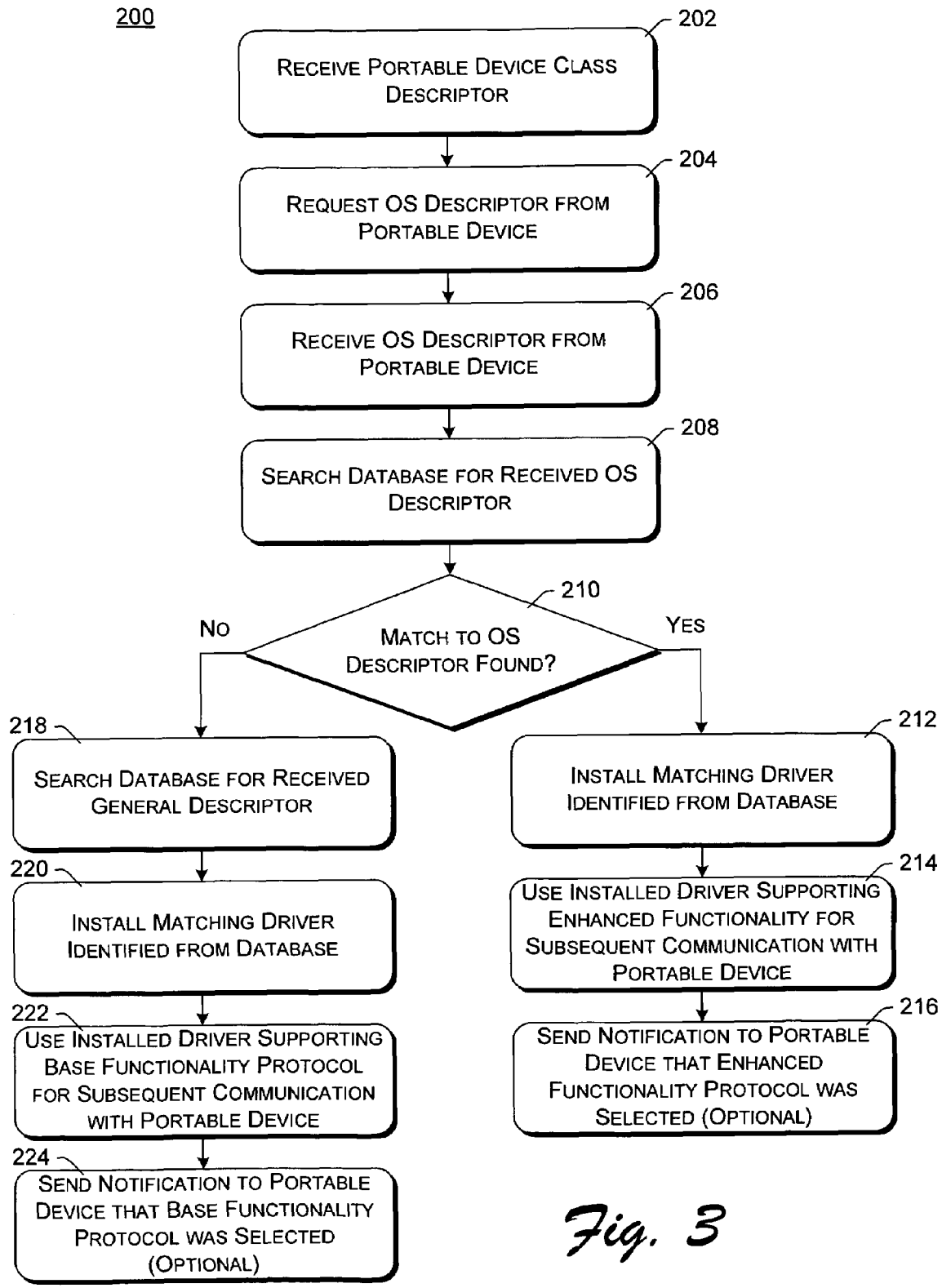
FIG. 3 is a flowchart illustrating an example process followed by a host device when connected to a portable device.

FIG. 3 is a flowchart illustrating an example process 200 followed by a host device 104 when connected to a portable device 102. Process 200 illustrates an example process followed by a host device 104 having an operating system that understands what OS descriptors are. Process 200 may be performed by the host device 104 the first time a particular portable device 102 is connected to host device 104, or alternatively may be performed each time the particular portable device 102 is connected to host device 104. Process 200 is repeated for each portable device 102 connected to host device 104. Process 200 can be implemented in software, firmware, hardware, or combinations thereof.

Initially, when the portable device is connected to the host device, the host device receives a class descriptor for the portable device (act 202). This class descriptor received in act 202 is, for example, class descriptor 154 of FIG. 2. The host device also requests the OS descriptor from the portable device (act 204), and receives the OS descriptor from the portable device (act 206). This OS descriptor received in act 206 is, for example, OS descriptor 156 of FIG. 2.

Once the OS descriptor is received, the host device searches its database listing portable devices for which the host device has a driver that is either already installed or can be installed, searching for a descriptor in the database that matches (is the same as) the received OS descriptor (act 208). This database is, for example, portable device database 176 of FIG. 2. Process 200 then proceeds based on whether the searching in act 208 resulted in a descriptor matching the received OS descriptor being found (act 210).

If the searching in act 208 resulted in a descriptor matching the received OS descriptor, then the driver associated with that matching descriptor is installed at the host device (act 212). In certain implementations, the database that includes the descriptors also identifies a driver associated with each descriptor in the database. Alternatively, a mapping of descriptors to associated drivers may be maintained elsewhere, or some other mechanism for identifying the proper driver based on the matching descriptor may be employed. The installed driver supporting the enhanced functionality protocol is then used by the host device for subsequent communication with the portable device (act 214). As the OS descriptor will match to a descriptor associated with a driver supporting the enhanced functionality protocol, the subsequent communication in act 214 will be using the enhanced functionality protocol.

After the driver is installed, the host device may optionally send a notification to the portable device that the enhanced functionality protocol was selected (act 216). This notification can take a variety of different forms. For example, a particular "protocol identification" command may be sent to the portable device. By way of another example, another command containing particular data that indicates that the host device has selected the enhanced functionality protocol may be sent to the portable device. By way of yet another example, a series of commands may be sent in a particular order to signify that the enhanced functionality protocol has been selected by the host device. Alternatively, act 216 may not be performed and the portable device may detect that the host device has selected the enhanced functionality protocol without the aid of a specific command, as discussed above.

Returning to act 210, if the searching in act 208 did not result in a descriptor matching the received OS descriptor, then the host device searches its database for a descriptor in the database that matches (is the same as) the received class descriptor (act 218). The driver associated with that descriptor matching the received class descriptor is installed at the host device (act 220). The driver associated with the matching descriptor is identified, for example, in the same manner as discussed above with respect to act 212. Alternatively, if no descriptor matching the class descriptor were found in act 218, then process 200 would end (e.g., and output an error).

The installed driver supporting the base functionality protocol is then used by the host device for subsequent communication with the portable device (act 222). As the class descriptor will match to a descriptor associated with a driver supporting the base functionality protocol, the subsequent communication in act 222 will be using the base functionality protocol.

After the driver is installed, the host device may optionally send a notification to the portable device that the base functionality protocol was selected (act 224). This notification can be sent in any of a variety of manners, such as discussed above with respect to act 216. Alternatively, act 224 may not be performed and the portable device may detect that the host device has selected the base functionality protocol without the aid of a specific command, as discussed above.

In another alternative implementation, the host device may implement only one of acts 216 and 224. If the portable device knows which of acts 216 and 224 is implemented, then the portable device can readily determine which protocol was selected by the host device based on whether the notification was received. For example, if the host device implements act 216 but not act 224, then the portable device knows that if the notification in act 216 is received then the enhanced functionality protocol has been selected by the host device, and if no notification of a selected protocol is received from the host device then the base functionality protocol has been selected by the host device.

Thus, as can be seen in FIG. 3, by using the descriptors received from the portable device, one of the multiple protocols supported by the portable device can be selected by the host device based on which protocols can also be supported by the host device in light of the drivers available to the host device. If the host device has a driver that supports the enhanced functionality protocol, then that driver will be loaded and the enhanced functionality protocol will be used for subsequent communications between the portable and host devices. However, if the host device does not have a driver that supports the enhanced functionality protocol, then a driver supporting the base functionality protocol will be loaded and the base functionality protocol will be used for subsequent communications between the portable and host devices.

Figure 4:
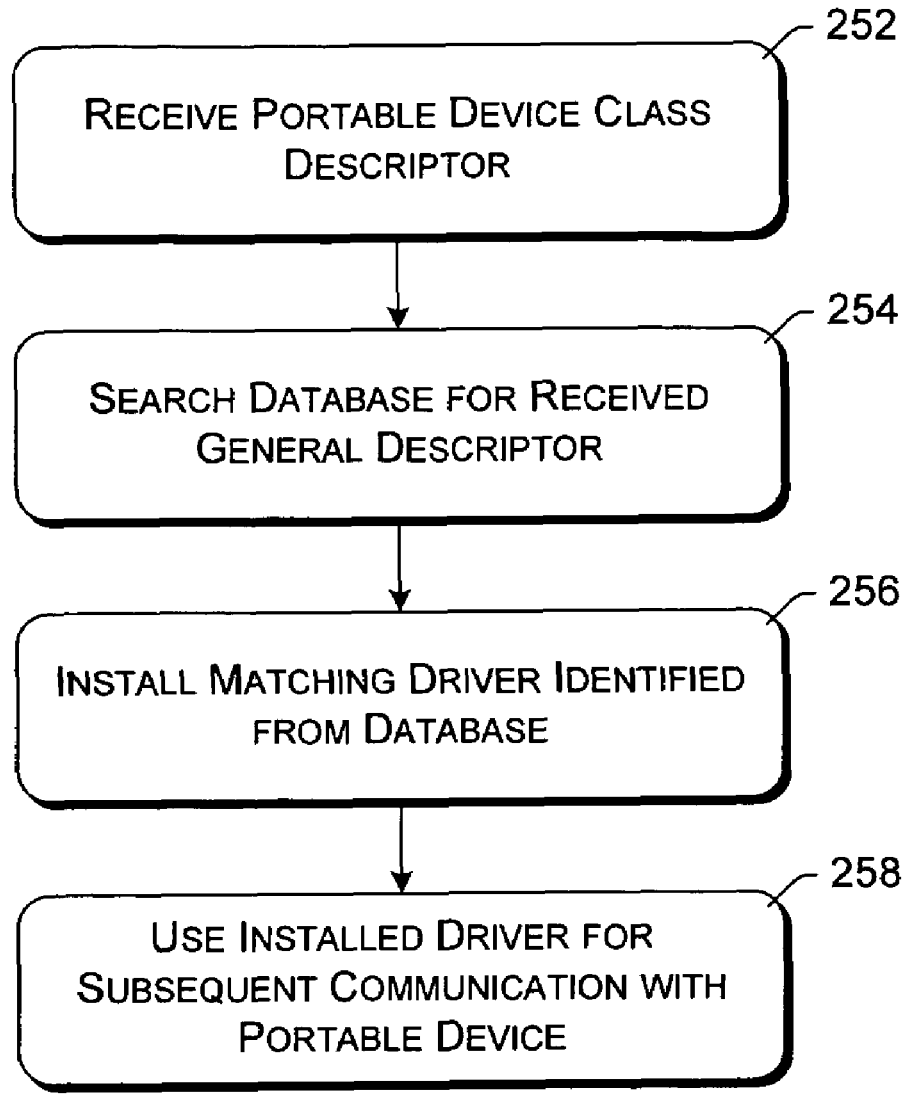
FIG. 4 is a flowchart illustrating an example process followed by a host device when connected to a portable device.

FIG. 4 is a flowchart illustrating an example process 250 followed by a host device 104 when connected to a portable device 102. Process 250 illustrates an example process followed by a host device 104 having an operating system that does not understand OS descriptors. Process 250 may be performed by the host device 104 the first time a particular portable device 102 is connected to host device 104, or alternatively may be performed each time the particular portable device 102 is connected to host device 104. Process 250 is repeated for each portable device 102 connected to host device 104. Process 250 can be implemented in software, firmware, hardware, or combinations thereof.

Initially, when the portable device is connected to the host device, the host device receives a class descriptor for the portable device (act 252). This class descriptor received in act 202 is, for example, class descriptor 154 of FIG. 2. Once the class descriptor is received, the host device searches its database listing portable devices for which the host device has a driver that is either already installed or can be installed, searching for a descriptor in the database that matches (is the same as) the received class descriptor (act 254). This database is, for example, portable device database 176 of FIG. 2.

If the searching in act 254 resulted in a descriptor matching the received class descriptor, then the driver associated with that matching descriptor is installed at the host device (act 256). Alternatively, if no descriptor matching the class descriptor were found in act 254, then process 250 would end (e.g., and output an error). In certain implementations, the database that includes the descriptors also identifies a driver associated with each descriptor in the database. Alternatively, a mapping of descriptors to associated drivers may be maintained elsewhere, or some other mechanism for identifying the proper driver based on the matching descriptor may be employed. The installed driver is then used by the host device for subsequent communication with the portable device (act 258). As the class descriptor will match to a descriptor associated with a driver supporting the base functionality protocol, the subsequent communication in act 258 will be using the base functionality protocol.

Figure 5:
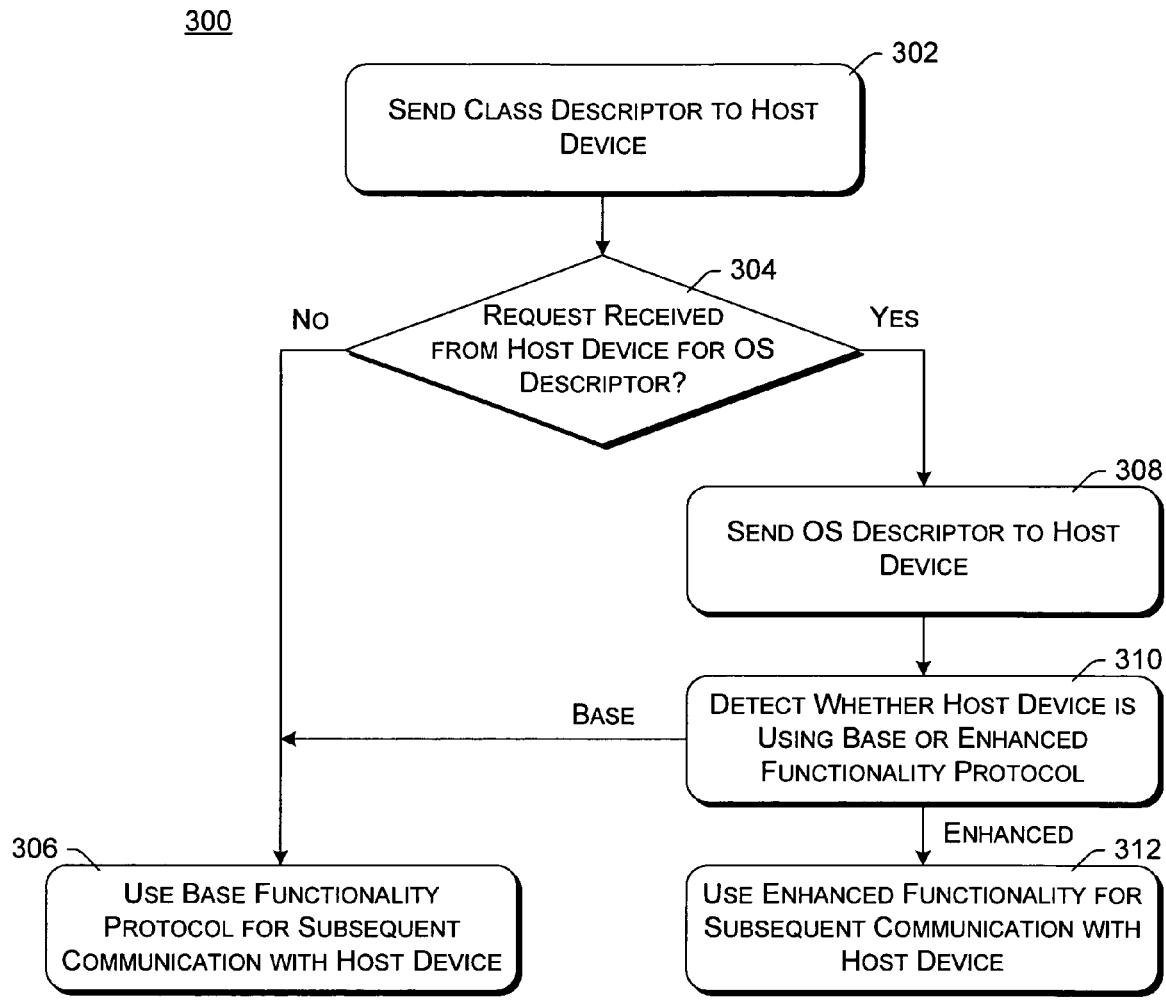
FIG. 5 is a flowchart illustrating an example process followed by a portable device when connected to a host device.

FIG. 5 is a flowchart illustrating an example process 300 followed by a portable device 102 when connected to a host device 104. Process 300 is performed each time the portable device 102 connects to a host device 104 (whether the same host device 104 or different host devices 104). Process 300 can be implemented in software, firmware, hardware, or combinations thereof.

Initially, when the portable device is connected to the host device, the portable device sends a class descriptor to the host device (act 302). This class descriptor sent in act 302 is, for example, class descriptor 154 of FIG. 2. Process 300 then proceeds based on whether a request for an OS descriptor is received from the host device (act 304). The portable device may optionally impose a time limit on when the request for the OS descriptor has to be received from the host device. For example, the portable device may require that the request for the OS descriptor be received within a threshold number of seconds of having sent the class descriptor. By way of another example, the portable device may require that the request for the OS descriptor be the first command or request received from the host device after the portable device sends the class descriptor.

If the request for an OS descriptor is not received from the host device, then the portable device uses the base functionality protocol for subsequent communications with the host device (act 306). If the request for an OS descriptor is not received from the host device, the portable device assumes that the host devices does not understand OS descriptors, and thus that the host device will be using the base functionality protocol for subsequent communications with the portable device.

However, if the request for an OS descriptor is received from the host device, then the portable device sends the OS descriptor to the host device (act 308). This class descriptor sent in act 308 is, for example, OS descriptor 156 of FIG. 2. The portable device then detects whether the host device is using the base functionality protocol or the enhanced functionality protocol (act 310). This detection can be accomplished in any of a variety of manners, as discussed above with respect to protocol detection module 158 of FIG. 2.

Process 300 then proceeds based on whether the portable device detects that the host device has selected the base functionality protocol or the enhanced functionality protocol for subsequent communications with the portable device. If the portable device detects that the host device has selected the base functionality protocol, then the portable device will use the base functionality protocol for subsequent communication with the host device (act 306). However, if the portable device detects that the host device has selected the enhanced functionality protocol, then the portable device will use the enhanced functionality protocol for subsequent communication with the host device (act 312).

Thus, as can be seen from the examples of FIGS. 3-5, the operation of the host device and the portable device provides a user-friendly environment. The host device automatically determines whether it can support the enhanced functionality of the portable device, and selects the driver and protocol to support the enhanced functionality if it is able to. Otherwise, the host device selects the driver and protocol to support the base functionality of the portable device. The portable device automatically detects which of the two protocols the host device has selected, and uses the same protocol. The user does not need to perform any manual operation, other than possibly powering on the portable device. No configuration settings on the portable device need to be changed by the user. Furthermore, no warning messages about not supporting a particular protocol are presented to the user, and no request for a driver or a driver installation disc are presented to the user.

It should be noted that in certain embodiments the processes of FIGS. 3-5 are performed only when the host device does not have a record of a particular portable device. Each time a new portable device is connected to a host device, the host device maintains a record of an identifier of the portable device as well as which protocol (e.g., the enhanced functionality protocol or the base functionality protocol) is being used to communicate with the portable device. This record can be maintained, for example, in the hardware configuration database 180 discussed above. Thus, when the portable device is subsequently connected to the host device, the portable device sends this identifier to the host device, which can then check its records to determine the proper protocol to use when communicating with the portable device. The host device can then begin sending commands using this protocol, and the portable device can then simply detect (e.g., analogous to act 310 of FIG. 5), which of the multiple protocols is being used by the host device.

It should also be noted that the automatic protocol determination discussed herein can operate in the presence of various power-saving schemes, such as hibernation mode, sleep mode, and so forth. Which protocol is to be used for communicating between the host and portable devices may be maintained when any such power-saving modes are entered (by the host device and/or the portable device), and communication between the devices using such protocol automatically resumed when resuming operation of the device from the power-saving mode. Alternatively, the processes discussed above with respect to FIGS. 3-5 may be repeated when resuming operation of the device from a power-saving mode.

It should further be noted that in certain embodiments, a "reset" signal or command may be sent from the host device to the portable device. In response to a reset signal or command, the portable device repeats the automatic detection process (e.g., act 310 of FIG. 5). This reset signal or command can be used, for example, in situations where the host device knows which of the multiple protocols it is expecting the portable device to use, but is not certain that the portable device is actually using that protocol (e.g., due to the portable device and/or host device having entered a power-saving mode, or one of the portable device or host device having been powered-off and then powered-on while the other device was in a power-saving mode). By issuing the reset signal or command, the host device can proceed with using the protocol that it expects the portable device to use, knowing that the portable device will automatically detect that protocol as being used by the host device.

Referring back to FIG. 2, automatic protocol determination module 106 also includes a safe mode module 162, which allows for a safe mode of operation of portable device 102. When safe mode module 162 is activated, safe mode module 162 causes portable device 102 to enter a safe mode of operation by causing portable device 102 to report information to host device 104 so that host device 104 will select only the base functionality protocol. This allows the user to override the automatic selection of the enhanced functionality protocol for communication between host device 104 and portable device 102, such as in situations where the user believes that there may be an error or problem in using the enhanced functionality protocol.

Safe mode module 162 can be activated or triggered in a variety of different manners. In certain embodiments, safe mode module 162 is activated by the user pressing a particular button or combination of buttons on portable device 102 while powering on portable device 102. For example, pressing those button(s) causes hardware or firmware in portable device 102 to set a register to a particular value. As part of its normal start-up or boot process, portable device 102 checks whether that register value is set to the particular value—if the register is set to the particular value then safe mode module 162 executes.

In other embodiments, safe mode module 162 is activated by host device 104. For example, if installation of an enhanced functionality protocol fails for some reason at host device 104, host device 104 can send a command to portable device 102 to set a register to a particular value (e.g., in nonvolatile memory, such as flash memory, of portable device 102). The next time portable device 102 is powered on, that particular register value causes portable device 102 to execute safe mode module 162. Safe mode module 162 may optionally change the register value in nonvolatile memory so that the next time portable device 102 is powered on safe mode module 162 is not executed.

Safe mode module 162 can cause portable device 102 to report information to host device 104 so that host device 104 will select only the base functionality protocol in a variety of different manners. In certain embodiments, safe mode module 162 notifies communication module 152 to not report OS descriptor 156 to host device 104 despite any request that might be received from host device 104 for OS descriptor 156. By preventing OS descriptor 156 from being sent to host device 104, host device 104 will select the base functionality protocol, and subsequent communications between host device 104 and portable device 102 will be using the base functionality protocol.

In other embodiments, safe mode module 162 notifies communication module 152 of a bogus or incorrect OS descriptor. If a request for the OS descriptor is received from host device 104, then communication module 152 returns this bogus or incorrect OS descriptor rather than OS descriptor 156.

In other embodiments, safe mode module 162 notifies communication module 152 to filter out any data sent from portable device 102 to host device 104 that matches the OS descriptor 156. Communication module 152 monitors the data being sent from portable device 102 to host device 104, and if a string of data that is the same as OS descriptor 156 is to be transmitted, communication module 152 either does not send the data or alternatively alters the data.

Figure 6:
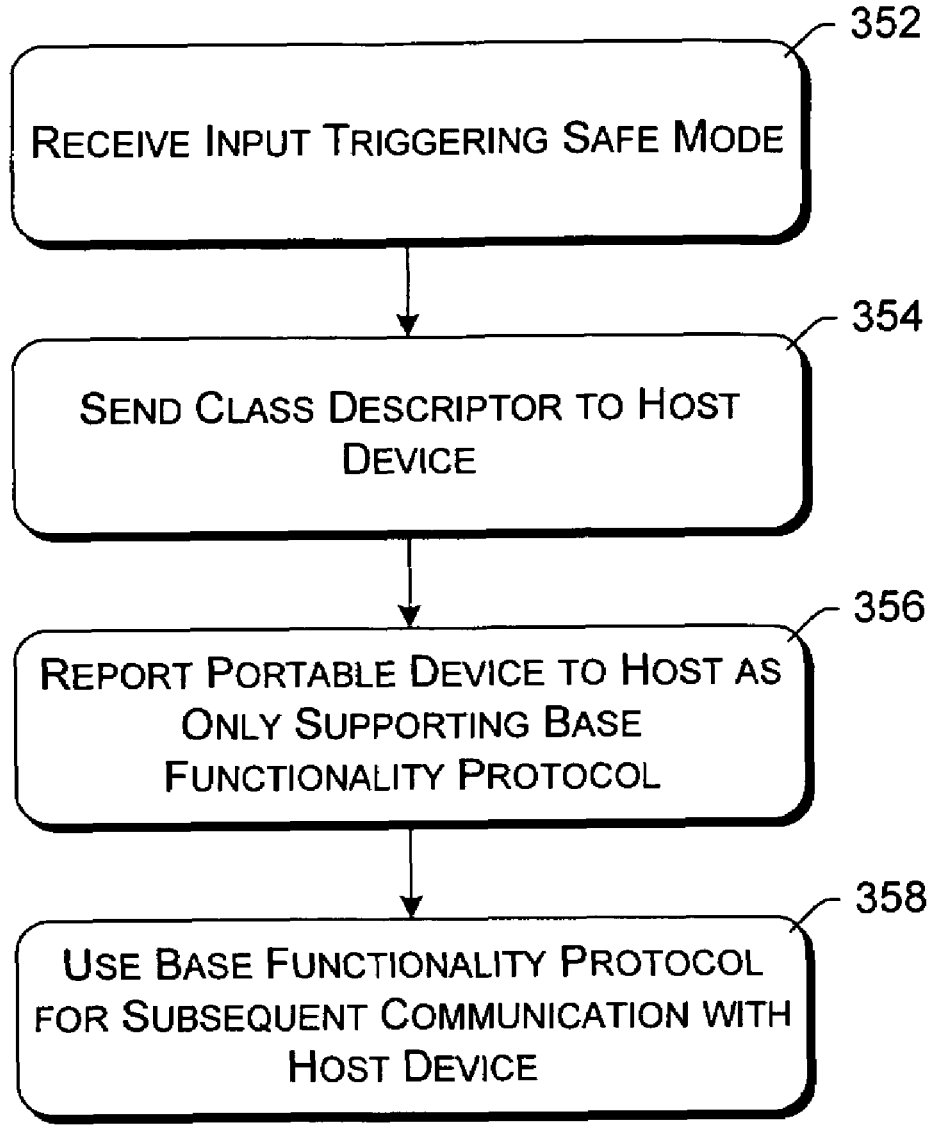
FIG. 6 is a flowchart illustrating an example process for using a safe mode.

FIG. 6 is a flowchart illustrating an example process 350 for using a safe mode. Process 350 can be implemented in software, firmware, hardware, or combinations thereof.

Initially, an input triggering the safe mode operation is received (act 352). As discussed above, the safe mode of operation can be activated or triggered in a variety of different manners, such as the user pressing a particular button or combination of buttons on the portable device while powering on the portable device, or in response to a command received from the host device. Once the safe mode of operation is triggered, when the portable device is connected to the host device, the portable device sends a class descriptor to the host device (act 354). This class descriptor sent in act 354 is, for example, class descriptor 154 of FIG. 2. The portable device is then reported to the host device as supporting only the base functionality protocol (act 356). As discussed above, this reporting can be performed in any of a variety of manners. The portable device then uses the base functionality protocol for subsequent communications with the host device (act 358).

The base functionality protocol is viewed as being more reliable, although typically less robust, than the enhanced functionality protocol. This view is based in part on the assumption that the base functionality protocol has typically been in use for longer than the enhanced functionality protocol, and thus that the base functionality protocol has fewer, if any, bugs and functions correctly with a larger number of host devices. Thus, when operating in safe mode, the portable and host devices communicate with one another using the base functionality protocol.

It should be noted that the safe mode operation is typically only for one session of the portable device (typically from power on to power off of the portable device), and is not repeated over multiple sessions of use with the portable device. For example, if a portable device is powered on in safe mode by the user pressing the proper button(s) on the portable device, the next time the portable device is powered on it will not be powered on in safe mode again unless the user again presses the proper button(s).

Returning to FIG. 2, situations can arise where operating system 182 of host device 104 is upgraded to a newer version. This upgrading can be installation of an entirely new operating system on host device 104, or alternatively upgrading of only selected components or portions of operating system 182. For example, operating system 182 may be upgraded to include additional drivers not previously included in operating system 182, with OS descriptors that are associated with those drivers being added to portable device database 176.

The upgrading of operating system 182 can result in additional drivers being added that support the enhanced functionality protocol for one or more portable devices 102 for which only the base functionality protocol was supported before the upgrading. A process referred to herein as "migration" is used to automatically detect which portable devices 102 that have been previously connected to the host device 104 and communicated with using the base functionality protocol are now able to be communicated with using the enhanced functionality protocol due to the new driver(s) added as part of the upgrading process.

Figure 7:
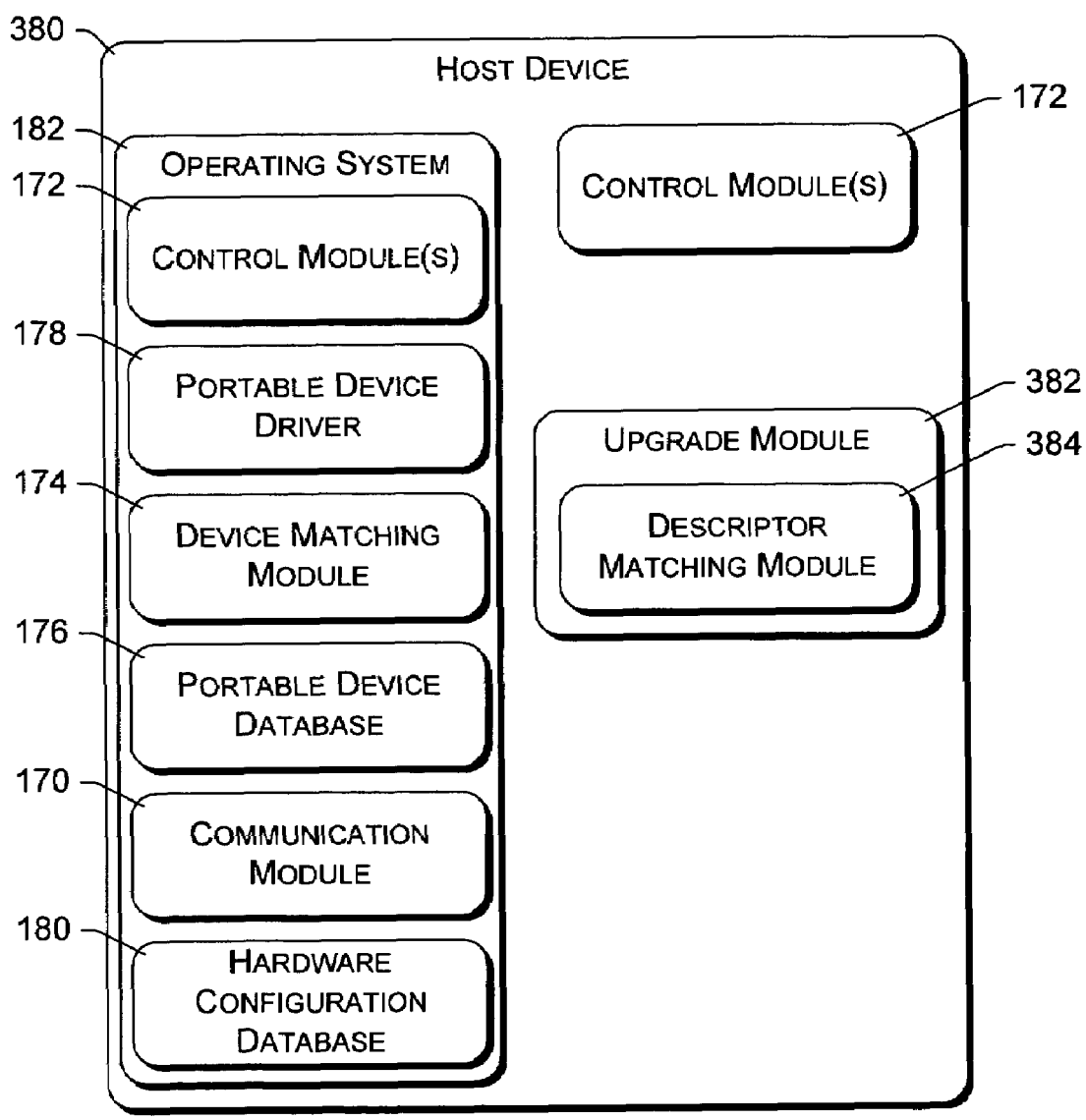
FIG. 7 illustrates another example host device in additional detail.

FIG. 7 illustrates an example host device 380 that can perform such migration in additional detail. Host device 380 of FIG. 7 can be, for example, host device 102 of FIG. 2. Host device 380 includes communication module 170, control module(s) 172, device matching module 174, portable device database 176, portable device driver 178, hardware configuration database 180, and operating system 182. These various modules and components 170-182 operate as discussed above with respect to host device 104 of FIG. 2.

In addition, host device 380 includes an upgrade module 382 including a descriptor matching module 384. Although illustrated as being separate from operating system 182, upgrade module 382 may alternatively be part of operating system 182. Upgrade module 382 controls the upgrading of operating system 182 on host device 380 to a new operating system or a new version of operating system 182. As mentioned above, this upgrading may be a replacement of all components and modules of operating system 182, or may involve changing only certain components and/or modules of operating system 182. Such changing can be adding components and/or modules as well as deleting components and/or modules.

After the changes to operating system 182 have been made by upgrade module 382, descriptor matching module 184 accesses hardware configuration database 180 to identify portable devices 102 that have been previously connected to the host device 104 and communicated with using the base functionality protocol. For each such portable device, descriptor matching module 184 checks whether there is a driver that is either already installed or can be installed on host device 380 to support the enhanced functionality protocol for that portable device. If such a driver is available to host device 380, then descriptor matching module 184 installs that driver if it is not already installed. Thus, the operating system on host device 380 is migrated from being able to communicate with the portable device using the base functionality protocol, to being able to communicate with the portable device using the enhanced functionality protocol. This migration occurs automatically as part of the upgrading process.

Figure 8:
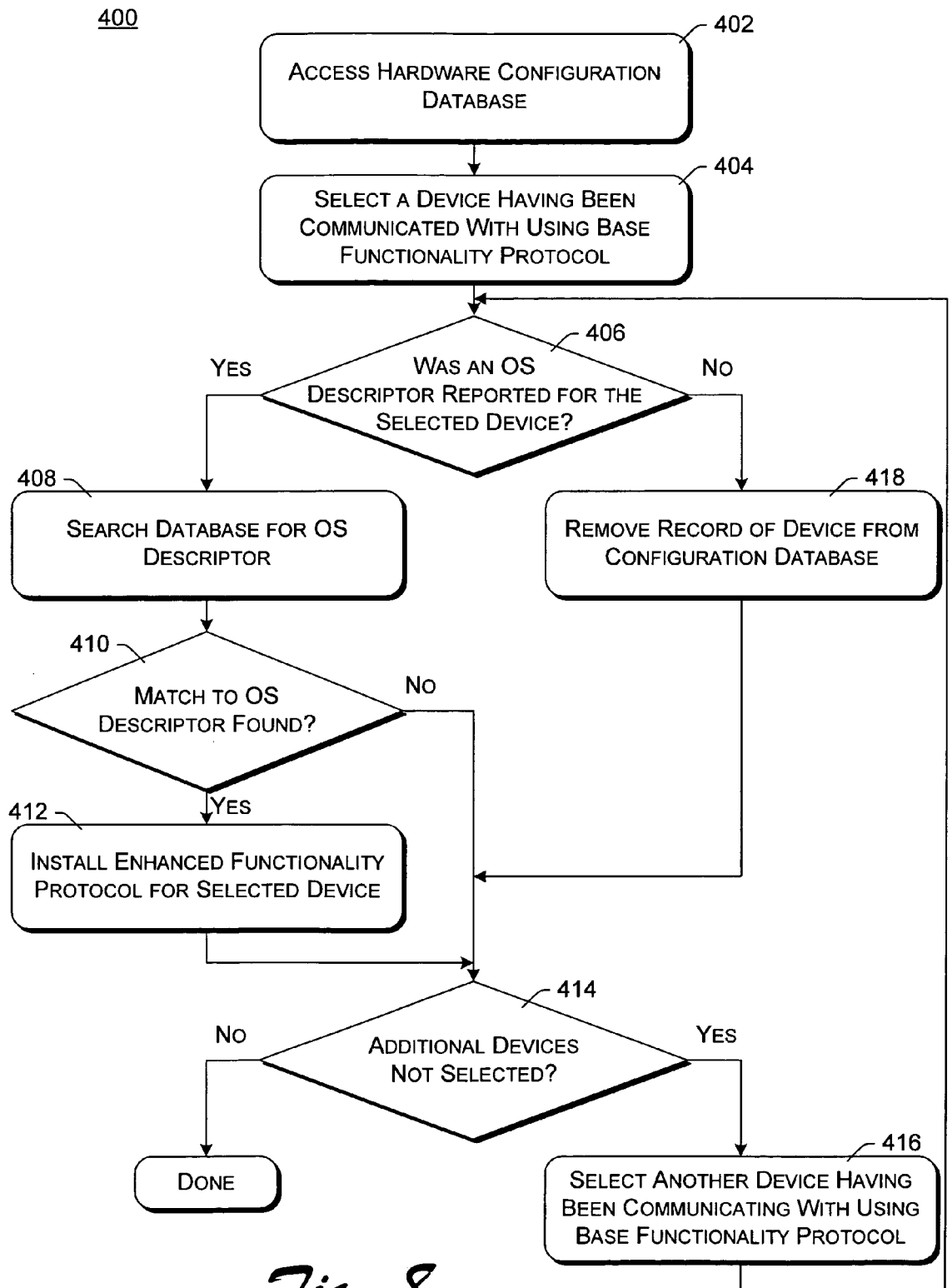
FIG. 8 is a flowchart illustrating an example migration process when upgrading an operating system.

FIG. 8 is a flowchart illustrating an example migration process 400 when upgrading an operating system. Process 400 can be implemented in software, firmware, hardware, or combinations thereof. In certain embodiments, process 400 is implemented as part of the program that is upgrading the operating system on the host device. As one of the last steps in the process of upgrading the operating system, process 400 is followed to migrate any portable devices that have been previously connected to the host device and communicated with using the base functionality protocol to being communicated with using the enhanced functionality protocol.

Initially, a hardware configuration database is accessed (act 402). In certain implementations, this hardware configuration database is hardware configuration database 180 of FIG. 2. A portable device identified within the hardware configuration database as being communicated with using the base functionality protocol is then selected (act 404). Portable devices may be identified separately within the hardware configuration database, such as by a special identifier or by being grouped in a particular section of the database. Alternatively, all devices satisfying a particular criteria may be identified as portable devices for the purposes of process 400, such as all devices that connect to the host device using the USB protocol. Such devices can be selected in any order (e.g., in their order of appearance within the hardware configuration database, in the order in which they were entered into the hardware configuration database, randomly, and so forth).

A check is then made as to whether an OS descriptor was reported for the selected device (act 406). This OS descriptor would have been reported by the device in response to a request for the OS descriptor from the host device. If an OS descriptor was reported for the selected device, the OS descriptor will typically be included in the hardware configuration database.

If an OS descriptor was reported for the selected device, then the host device searches its database listing portable devices for which the host device has a driver that is either already installed or can be installed, searching for a descriptor in the database that matches (is the same as) the OS descriptor (act 408). This database is, for example, portable device database 176 of FIG. 2. Process 400 then proceeds based on whether the searching in act 408 resulted in a descriptor matching the OS descriptor being found (act 410).

If the searching in act 408 resulted in a descriptor matching the OS descriptor, then the driver associated with that matching descriptor is installed at the host device (act 412). As part of the installation process, the hardware configuration database is modified to reflect the new driver to be used for this portable device. Subsequently, when the portable device is connected to the host device, the hardware configuration database will be accessed and the new driver identified, so that subsequent communication with the portable device will be using the new driver which supports the enhanced functionality protocol, and thus will be using the enhanced functionality protocol.

Process 400 then proceeds to check whether there are any additional portable devices identified in the hardware configuration database that have not yet been selected (act 414). If there are any such portable devices, then process 400 selects one of the remaining portable devices identified within the hardware configuration database as being communicated with using the base functionality protocol but that has not yet been selected as part of process 400 (act 416). If there are no portable devices identified in the hardware configuration database that have not yet been selected, then process 400 ends.

Returning to act 410, if the searching in act 408 resulted in no descriptor matching the OS descriptor, then process 400 proceeds to act 414 to check whether there are any additional portable devices identified in the hardware configuration database that have not yet been selected.

Returning to act 406, if an OS descriptor was not reported for the selected device, then the record of the portable device is removed from the hardware configuration database (act 418). Process 400 removes the record of the portable device from the hardware configuration database because process 400 assumes that there is no OS descriptor for the portable device because the host device did not previously request an OS descriptor for the portable device. By removing the record of the portable device from the hardware configuration database, the next time the portable device is connected to the host device the host device will perform process 200 discussed above with respect to FIG. 3 for the portable device. This will allow the host device to request the OS descriptor from the portable device.

Thus, as can be seen above, in situations where a portable device was previously communicating with the host device using the base functionality protocol, migration process 400 automatically upgrades the host device to use the enhanced functionality protocol if it becomes available. This results in a user-friendly experience because when the user upgrades his or her host system, after the changeover to the enhanced functionality protocol is performed automatically for the user.

Figure 9:
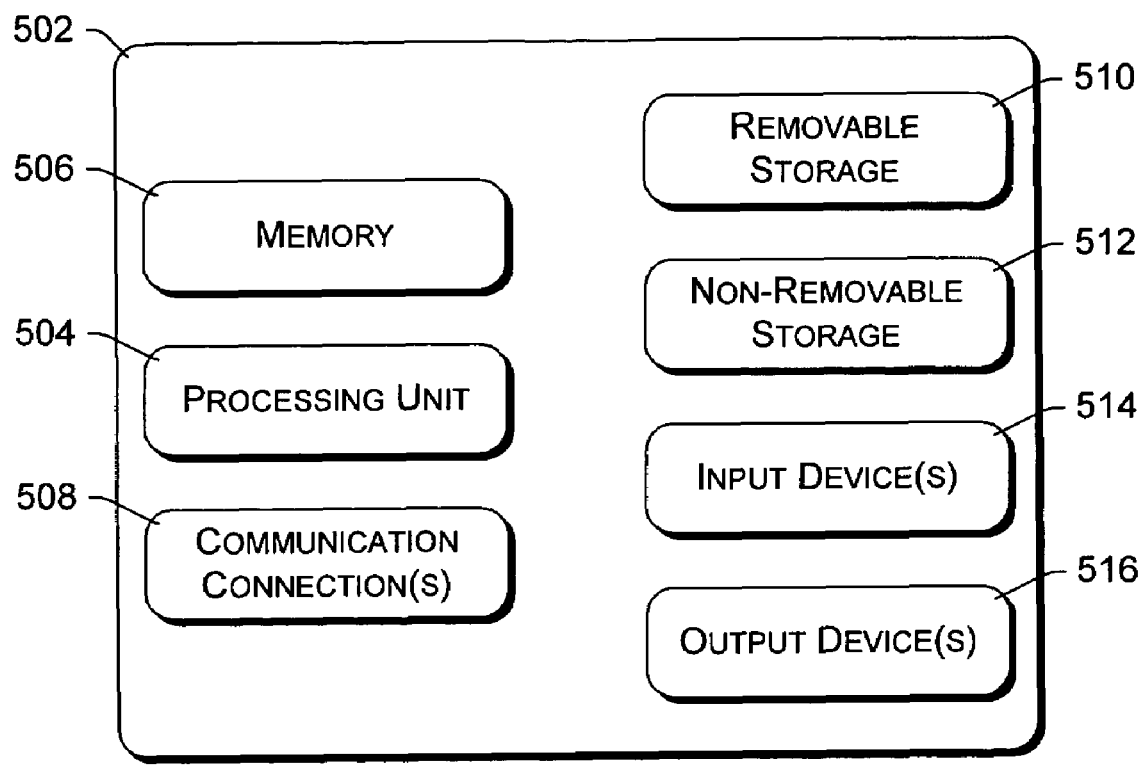
FIG. 9 illustrates an example computing device for implementing the automatic protocol determination for portable devices supporting multiple protocols described herein.

FIG. 9 illustrates an example computing device 502 for implementing the automatic protocol determination for portable devices supporting multiple protocols described herein. Device 502 can be, for example, a portable device 102 or host device 104 of FIG. 1 or 2, or host device 380 of FIG. 7. Device 502 typically includes a controller or processing unit 504 and memory 506. Depending on the exact configuration and type of computing device, memory 506 may be volatile (such as RAM), non-volatile (such as ROM, flash memory, etc.) or some combination of volatile and non-volatile. Device 502 also typically includes a communication connection(s) 508 allowing device 502 to communicate with other devices, computers, networks, servers, and so forth using either wired and/or wireless media.

Additionally, device 502 may also have mass storage (removable and/or non-removable) 510 and/or 512, such as magnetic or optical disks or tape, flash memory, and so forth. Similarly, device 502 may also have input device(s) 514 such as a keyboard, mouse, pen, voice input device, touch input device, and so forth. Device 502 may also have output device(s) 516 such as a display, speaker, printing mechanism, and so forth.

Computing device 502 typically includes at least some form of computer readable media. Computer readable media can be any available media that can be accessed by, or included as part of, device 502. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD (digital versatile discs or digital video discs) or other optical storage, magnetic cassettes, magnetic tape, magnetic disk storage or other magnetic storage devices, or any other medium which can be used to store the desired information and which can accessed by, or included as part of, device 502. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired bus, a wired network or direct-wired connection, and wireless media such as acoustic, RF, infrared and other wireless media. Combinations of the any of the above should also be included within the scope of computer readable media.

The techniques described herein may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. The program modules, or portions thereof, may reside in different computer readable media at different times.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, implemented in a portable device, the method comprising:
   sending a class descriptor to a host device, the class descriptor describing a class of the portable device;
   detecting whether a request for an operating system (OS) descriptor has been sent by the host device, the OS descriptor describing a functionality supported by the portable device;
   communicating with the host device, using a base functionality,
   if the request for the OS descriptor is not received;
   sending the OS descriptor to the host device, and detecting whether the host device is using a base functionality protocol or an enhanced functionality protocol to communicate with the portable device based at least in part on the received OS descriptor, the enhanced functionality protocol allowing additional features of the portable device to be accessed by the host device and/or allowing more functionality of the portable device to be used by the host device; and
   communicating, using the enhanced functionality protocol, with the host device, if it is detected that the host device is using the enhanced functionality protocol to communicate with the portable device, and otherwise using the base functionality protocol to communicate with the host device.

2. A method as recited in claim 1, further comprising communicating with the host device over a Universal Serial Bus (USB) connection.

3. A method as recited in claim 1, wherein the base functionality protocol comprises the Universal Serial Bus (USB) Mass Storage Class—UFI Command Specification, and wherein the enhanced functionality protocol comprises the Media Transfer Protocol (MTP).

4. One or more computer-readable storage media having stored thereon a plurality of instructions that, when executed by one or more processors of a portable device, causes the one or more processors to:
   send, to a host device coupled to the portable device, a class descriptor identifying a class of the portable device;
   communicate, using a base functionality protocol, with the host device if no request for an operating system (OS) descriptor is received from the host device; and
   when a request for the OS descriptor is received from the host device, then:
   send the OS descriptor to the host device;
   detect whether the host device is using, for subsequent communication with the portable device, the base functionality protocol or an enhanced functionality protocol based at least in part on the received OS descriptor; and
   communicate, using the enhanced functionality protocol, with the host device if it is detected that the host device is using the enhanced functionality protocol for subsequent communication with the portable device, and otherwise use the base functionality protocol for subsequent communication with the host device.

5. One or more computer-readable storage media as recited in claim 4, wherein to detect whether the host device is using the base functionality protocol or the enhanced functionality protocol is to:
   determine whether a command received from the host device is part of the base functionality protocol or the enhanced functionality protocol; and
   detect that the host device is using the one of the base functionality protocol and the enhanced functionality protocol that the command is part of.

6. One or more computer-readable storage media as recited in claim 4, wherein to detect whether the host device is using the base functionality protocol or the enhanced functionality protocol is to:
   determine whether a particular signature, associated with one of the base functionality protocol or the enhanced functionality protocol, is included in a data structure of a command received from the host device; and
   detect that the host device is using the one of the base functionality protocol and the enhanced functionality protocol that the particular signature is associated with if the particular signature is included in the data structure of the command.

7. One or more computer-readable storage media as recited in claim 4, wherein to detect whether the host device is using the base functionality protocol or the enhanced functionality protocol is to:
   determine whether a command received from the host device is a protocol identification command; and detect that the host device is using the one of the base functionality protocol and the enhanced functionality protocol that is identified by the protocol identification command.

8. One or more computer-readable storage media as recited in claim 4, wherein the plurality of instructions further cause the one or more processors to determine, if a request for the OS descriptor is not received within a particular time limit, that no request for the OS descriptor is received from the host device.

9. One or more computer-readable storage media as recited in claim 4, wherein the base functionality protocol comprises the Universal Serial Bus (USB) Mass Storage Class—UFI Command Specification, and wherein the enhanced functionality protocol comprises the Media Transfer Protocol (MTP).

10. One or more computer-readable storage media as recited in claim 4, wherein sending both the class descriptor and the OS descriptor to the host device indicates to the host device that the portable device supports both the base functionality protocol and the enhanced functionality protocol.

11. One or more computer-readable storage media as recited in claim 4, wherein the plurality of instructions further cause the one or more processors to determine, use the base functionality protocol if a request for the OS descriptor is not the first command or request received from the host device after the portable device sends the class descriptor.

12. A system, comprising:
a communication module to send to a host device a class descriptor, the class descriptor describing a class of the system;
a protocol detection module to detect whether a request for an operating system (OS) descriptor has been sent by the host device, OS descriptor describing a functionality supported by the system, and based at least in part on the OS descriptor received by the host device, to detect whether the host device is using, for subsequent communication with the system, a base functionality protocol or an enhanced functionality protocol; and
a notification module, coupled to the protocol detection module, to notify the communication module whether the host device is using, for subsequent communication with the system, the base functionality protocol or the enhanced functionality protocol as determined by the protocol detection module.

13. A system as recited in claim 12, wherein the communication module is to communicate with the host device using the base functionality protocol or the enhanced functionality protocol as indicated by the notification module.

14. A system as recited in claim 12, wherein:
the protocol detection module is to detect that, if the request for an OS descriptor is not received from the host device, the host device is to use the base functionality protocol for subsequent communication with the system.

15. A system as recited in claim 12, wherein the protocol detection module is further to:

check whether a particular signature, associated with one of the base functionality protocol or the enhanced functionality protocol, is included in a data structure of the one or more commands; and
detect that the host device is using the one of the base functionality protocol and the enhanced functionality protocol that the particular signature is associated with if the particular signature is included in the data structure of the one or more commands.

16. A system as recited in claim 12, wherein to detect whether the host device is using the base functionality protocol or an enhanced functionality protocol is to:
check whether the one or more commands are a protocol identification command, and if so then detect that the host device is using the one of the base functionality protocol and the enhanced functionality protocol that is identified by the protocol identification command.

17. A portable device, comprising:
means for sending to a host device, a class descriptor identifying a class of the portable device;
means for detecting whether a request for an operating system (OS) descriptor has been sent by the host device, the OS descriptor describing a functionality supported by the portable device, wherein the request for the OS descriptor is not received, then using a base functionality to communicate with the host device;
means for detecting, based at least in part on the received OS descriptor, which one of multiple protocols is being used by the host device for subsequent communication with the portable device, the multiple protocols including at least the base functionality protocol and an enhanced functionality protocol; and
means for using, for subsequent communication with the host device, the detected one of the multiple protocols.

18. One or more computer-readable storage media having stored thereon a plurality of instructions that, when executed by one or more processors of a device, causes the one or more processors to:
receive a class descriptor from a portable device, the class descriptor describing a class of the portable device;
receive an operating system (OS) descriptor from the portable device, the OS descriptor describing a functionality supported by the portable device;
select, based at least in part on the received OS descriptor, one of a plurality of protocols to use in communicating with the portable device, the one of a plurality of protocols including at least a base functionality protocol and an enhanced functionality protocol; and
send, to the portable device, a protocol identification command identifying the one of the plurality of protocols selected by the device.

19. One or more computer-readable storage media as recited in claim 18, wherein the plurality of instructions further cause the one or more processors to send the protocol identification command only if the selected protocol is the enhanced functionality protocol.

* * * * *